United States Patent
Brotto

(10) Patent No.: US 6,172,487 B1
(45) Date of Patent: Jan. 9, 2001

(54) METHOD AND APPARATUS FOR CHARGING BATTERIES

(75) Inventor: Daniele C. Brotto, Baltimore, MD (US)

(73) Assignee: Black & Decker Inc., Newark, DE (US)

(*) Notice: Under 35 U.S.C. 154(b), the term of this patent shall be extended for 0 days.

(21) Appl. No.: 09/292,166

(22) Filed: Apr. 15, 1999

Related U.S. Application Data

(60) Provisional application No. 60/089,567, filed on Jun. 17, 1998.

(51) Int. Cl.⁷ .................................................. H02J 7/04
(52) U.S. Cl. ............................................. 320/150; 320/137
(58) Field of Search ................................... 320/150, 151, 320/154, 137, 134

(56) References Cited

U.S. PATENT DOCUMENTS

| | | | |
|---|---|---|---|
| 3,852,652 | 12/1974 | Jasinski | 320/150 |
| 4,622,509 | 11/1986 | Spruijt | 320/130 |
| 4,755,735 * | 7/1988 | Inakagata | 320/150 |
| 5,241,259 | 8/1993 | Patino et al. | 320/150 |
| 5,363,031 | 11/1994 | Miller et al. | 320/115 |
| 5,391,974 | 2/1995 | Shiojima | 320/150 |
| 5,396,163 * | 3/1995 | Nor et al. | 320/159 |
| 5,403,093 | 4/1995 | Flynn, Jr. | 320/150 |
| 5,519,303 * | 5/1996 | Goedken et al. | 320/150 |
| 5,548,201 | 8/1996 | Grabon | 320/150 |
| 5,550,453 | 8/1996 | Bergquist | 320/148 |
| 5,627,451 | 5/1997 | Takeda | 320/151 |
| 5,686,808 | 11/1997 | Lutz | 320/110 |
| 5,896,024 * | 4/1999 | Bradus et al. | 320/125 |

FOREIGN PATENT DOCUMENTS

| | | |
|---|---|---|
| 4109833 | 4/1992 | (JP). |
| 5015081 | 1/1993 | (JP). |
| 6113475 | 4/1994 | (JP). |
| 6315233 | 11/1994 | (JP). |

* cited by examiner

*Primary Examiner*—Peter S. Wong
*Assistant Examiner*—Lawrence Luk
(74) *Attorney, Agent, or Firm*—Adan Ayala

(57) ABSTRACT

The charging method includes providing a current to the battery pack, sensing battery temperature, determining temperature change rate, and disabling termination of the charging method based on a temperature-based scheme if the temperature change rate exceeds a first predetermined threshold within a first predetermined period of time. Termination of the charging method based on a temperature-based scheme may be re-enabled if the temperature change rate is less than a second predetermined threshold. Preferably the second predetermined threshold is equal to the first predetermined threshold. Alternatively, termination of the charging method based on a temperature-based scheme may be re-enabled after a second predetermined period of time has elapsed. Also disclosed herein is a battery charging method comprising providing a current to the battery pack, sensing battery temperature, determining temperature change rate, and suspending the current if the temperature change rate exceeds a first predetermined threshold within a first predetermined period of time. Current will be re-sent if the temperature change rate is less than a second predetermined threshold. Preferably the second predetermined threshold is equal to the first predetermined threshold. Alternatively, current will be re-sent after a second predetermined period of time has elapsed.

46 Claims, 4 Drawing Sheets

METHOD AND APPARATUS FOR CHARGING BATTERIES

CROSS-REFERENCE TO RELATED APPLICATIONS

The present application is based upon and claims priority under 35 USC §119 and 37 CFR §1.78 of copending US provisional application Ser. No. 60/089,567, filed on Jun. 17, 1998.

FIELD OF THE INVENTION

This invention relates generally to a method and apparatus for charging rechargeable batteries.

BACKGROUND OF THE INVENTION

The several advantages of cordless power for portable power tools and certain kitchen and domestic appliances have led to the development of a wide range of sizes of power- or battery-packs, that is, a contained group of power cells. These power cells may include nickel cadmium (NiCd), nickel metal hydride (NiMH), lithium, or lead-acid cells, etc.

During the charging process, the battery temperature and voltage vary. For example, battery temperature increases in a nonlinear manner as the battery is charged. The battery temperature then quickly increases as the battery becomes fully charged. However, if the charging process is not stopped when the battery is fully charged, the battery could be overcharged and thus damaged by the rising temperature. Accordingly, battery temperature or battery voltage are usually monitored as indicators of the full charge condition.

Among the voltage monitoring methods, the Saar double inflection termination method described in U.S. Pat. Nos. 4,388,582 and 4,392,101, is preferred to detect a battery reaching fill charge. Other voltage monitoring methods more typically employed are (1) the minus-delta-voltage method, (2) the peak detect method, and (3) the voltage slope detect method. In the minus-delta-voltage method, a sample of the battery peak voltage is stored and compared to the most recent voltage. Termination occurs when the most recent voltage falls below a set point, usually within between 0.5% and 1.0% of the stored peak, or about 10 to 20 millivolts per cell for a NiCd battery.

The peak detect method is more modern version of the minus-delta-voltage method. Basically, the same method is used, except the set point can be set closer to the peak by using more accurate instrumentation.

The slope detect method is another voltage monitoring method. According to this method, the voltage peak B is detected by calculating the slope of the voltage curve V, or voltage change rate (dV/dt). Termination occurs when the voltage change rate is 0 or negative.

Temperature monitoring methods typically employed are (1) absolute temperature termination and (2) temperature change rate termination. Absolute temperature termination relies on the temperature rise that occurs when the battery is fully charged. Under this method, the charging process will be stopped when the battery temperature reaches a certain temperature.

The temperature change rate termination method requires monitoring the changing slope of the battery temperature, or temperature change rate (dT/dt), during the charging process. Termination occurs when the temperature change rate reaches and/or exceeds a predetermined rate. In other words, termination occurs when a trip point is reached and/or exceeded. However, selecting the appropriate trip point is problematic, especially under conditions of varying ambient temperature conditions. Accordingly, the method may cause undercharged batteries.

It is preferable to provide a charging and monitoring method that ill not result in undercharged batteries.

SUMMARY OF THE INVENTION

In accordance with the present invention, a method for charging a rechargeable battery pack is proposed. The charging method includes providing a current to the battery pack, sensing battery temperature, determining temperature change rate, and disabling termination of the charging method based on a temperature-based scheme if the temperature change rate exceeds a first predetermined threshold within a first predetermined period of time. Termination of the charging method based on a temperature-based scheme may be re-enabled if the temperature change rate is less than a second predetermined threshold. Preferably the second predetermined threshold is equal to the first predetermined threshold. Alternatively, termination of the charging method based on a temperature-based scheme may be re-enabled after a second predetermined period of time has elapsed.

Also disclosed herein is a battery charging method comprising providing a current to the battery pack, sensing battery temperature, determining temperature change rate, and suspending the current if the temperature change rate exceeds a first predetermined threshold within a first predetermined period of time. Current will be re-sent if the temperature change rate is less than a second predetermined threshold. Preferably the second predetermined threshold is equal to the first predetermined threshold. Alternatively, current will be re-sent after a second predetermined period of time has elapsed.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which.

DETAILED DESCRIPTION

The invention is now described with reference to the accompanying figures, wherein like numerals designate like parts. All the teachings of the Saar U.S. Pat. Nos. 4,388,582 and 4,392,101 are hereby incorporated by reference into this specification.

Figure 1:
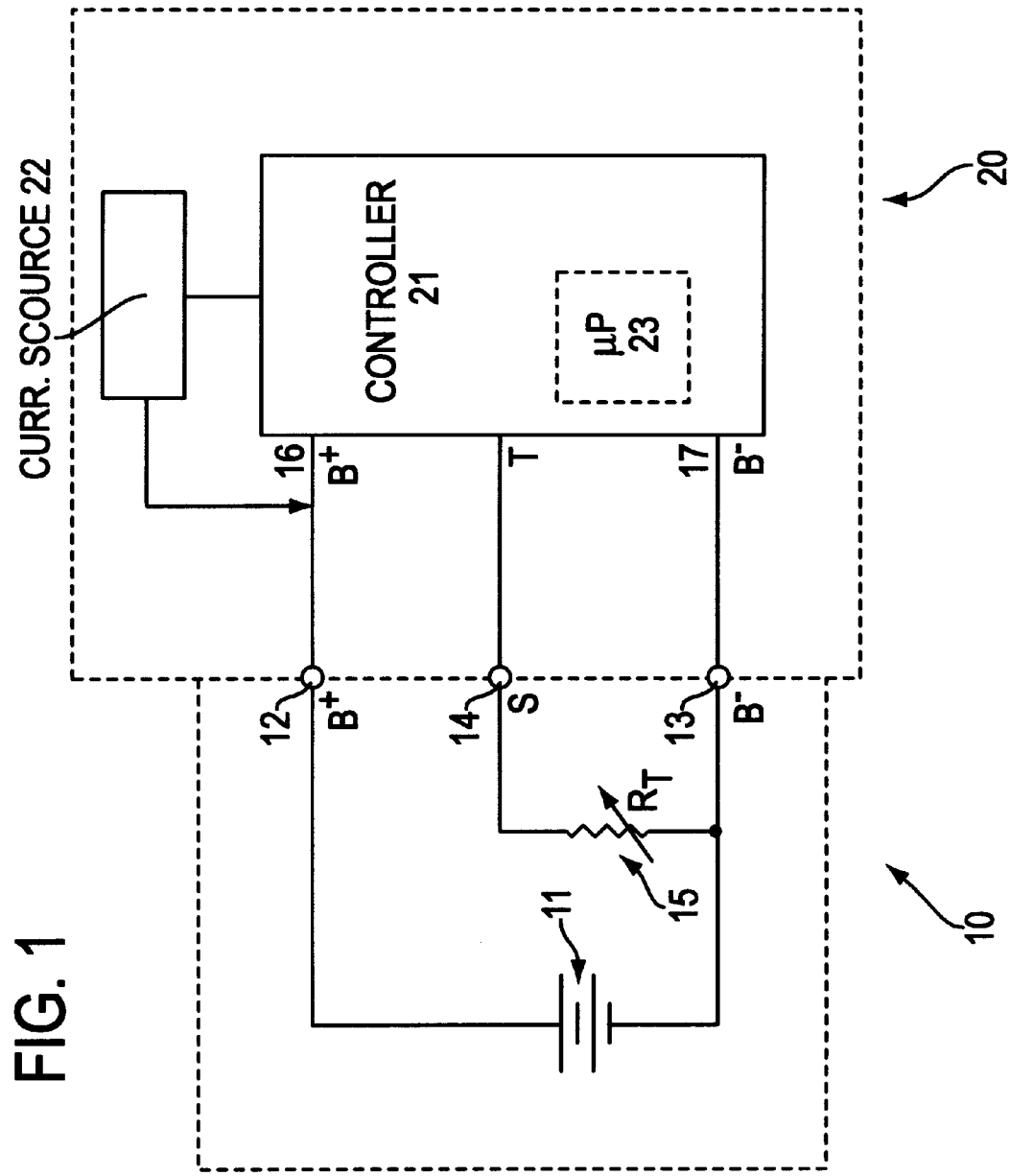
FIG. 1 is a circuit schematic diagram of a battery charger according to the present invention.

Referring to FIG. 1, a battery 10 is connected to a charger control circuit 20. Battery 10 comprises a plurality of battery cells 11 connected in series, which dictate the voltage and storage capacity for battery 10. Battery 10 includes three battery contacts: first battery contact 12, second battery contact 13, and third battery contact 14. Battery contact 12 is the B+ (positive) terminal for battery 10. Battery contact 13 is the B− or negative/common terminal. Battery contact 14 is the S or sensing terminal. Battery contacts 12 and 13 receive the charging current sent from the charger control circuit 20 (preferably from current source 22, as discussed below)for charging the battery 10.

As shown in FIG. 1, the battery cells 11 are coupled between the battery contacts 12 and 13. In addition, preferably coupled between battery contacts 13 and 14 is a temperature sensing device 15, such as a negative temperature co-efficient (NTC) resistor, or thermistor, RT. The temperature sensing device is preferably in closer proximity to the cells 11 for monitoring of the battery temperature. Persons skilled in the art will recognize that other components, such as capacitors, etc., or circuits can be used to provide a signal representative of the battery temperature.

The charger control circuit 20 preferably comprises a controller 21, which in turn includes positive terminal (13+) 16 and negative (B−) terminal 17, which are coupled to battery 10 via battery contacts 12 and 13, respectively. The positive terminal may also act as an input, preferably an analog/digital input, in order for the controller 21 to detect the battery voltage. In addition, the controller 21 may include another input T, preferably an analog/digital input which is coupled to the temperature sensing device 15 via the third battery contact 14 (S). This allows the controller 21 to monitor the battery temperature. Controller 21 includes a microprocessor 23 for controlling the charging and monitoring operations. Controller 21 may control a current source 22 that provides current to battery 10. This current may be a fast charging current and/or an equalization current. Current source 22 may be integrated within controller 21.

Figure 2:
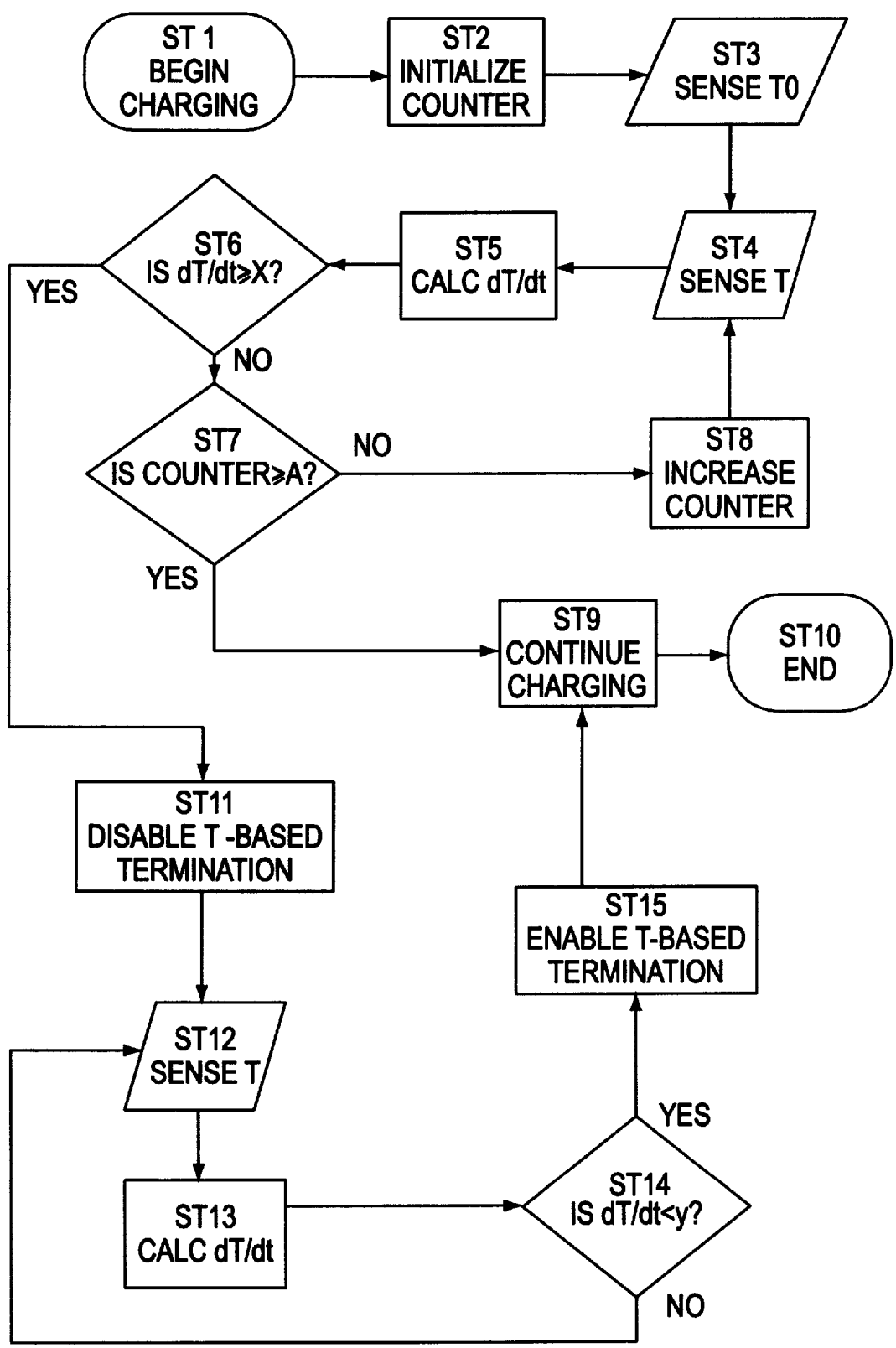
FIG. 2 is a flowchart illustrating a first embodiment of the charging process according to the present invention.

FIG. 2 is a flowchart of the different steps comprised in a first embodiment of the proposed method. The first step (ST1) is to begin the charging process by sending current to battery 10. The controller 21 may initialize a counter (ST2).

The controller 21, via its inputs, may sense the initial battery temperature T0 (ST3). Preferably, if the initial temperature T0 is above a certain threshold, the controller 21 will discontinue charging. The controller 21 may restart charging if the battery temperature falls below the threshold or after a predetermined period of time has elapsed. Preferably, charging will be suspended if the battery temperature is above about 45° C.

Persons skilled in the art should recognize that steps ST2 and/or ST3 may be performed before the charging process is begun on step ST1.

The controller 21 preferably continues to sense the battery temperature (ST4). In addition, the controller 21 calculates the temperature change rate, i.e., first derivative of temperature dT/dt (ST5). The controller 21 also determines whether the temperature change rate is above or below a predetermined threshold X (ST6). Preferably, the predetermined threshold X for NiCd batteries is between about 0.7 and 2.0 Celsius degrees per minute, with the preferred threshold being about 1.2 Celsius degrees per minute.

If the temperature change rate is below threshold X, the controller 21 may then determine whether the counter is higher than or equal to a predetermined threshold A (ST7). If not, the counter is increased (ST8) and the controller 21 continues to sense the battery temperature (ST4). If the counter is higher than or equal to threshold A, the controller 21 then continues charging the battery (ST9) until termination occurs (ST10).

Persons skilled in the art will recognize that the counter is used to determine whether the temperature change rate exceeds threshold X within a predetermined period of time.

Accordingly, the counter may be replaced by a timer. Alternatively, the decreasing counter may be used instead of the increasing timer mentioned above. Again, the speed, frequency or orientation of the counter do not matter so long as it can delineate a predetermined period of time. The predetermined period of time may be less than 5 minutes long, preferably beginning at the start of the charging process. Preferably, the predetermined period of time is 2 minutes.

If the temperature change rate is above the threshold X, termination of the charging process based on temperature schemes is disabled (ST11). In other words, the charging process cannot be terminated based on the absolute temperature and/or temperature change rate schemes explained above. Further, the charging process preferably cannot be terminated based on any other scheme that uses any type of temperature information, such as the double derivative of temperature scheme disclosed in U.S. Pat. No. 5,519,303. Charging nevertheless may still be terminated at any time using voltage-based schemes as explained above.

The controller 21 then preferably continues to sense the battery temperature (ST12), calculating the temperature change rate dT/dt (ST13), and determining whether the temperature change rate is above or below a predetermined threshold Y (ST14). Preferably, the predetermined threshold Y is equal to the predetermined threshold X.

The controller 21 may continue repeating these steps until the temperature change rate is below threshold Y, or until a predetermined period of time has elapsed. Once either condition is met, termination of the charging process based on temperature schemes is re-enabled (ST15). In other words, the charging process can now be terminated based on the absolute temperature, temperature change rate and/or double derivative of temperature schemes explained above. Charging of the battery then continues (ST9) until termination (ST10).

Persons skilled in the art will recognize that further equalization and/or maintenance currents may be fed to battery 10 after the termination of the charging process.

Figure 3:
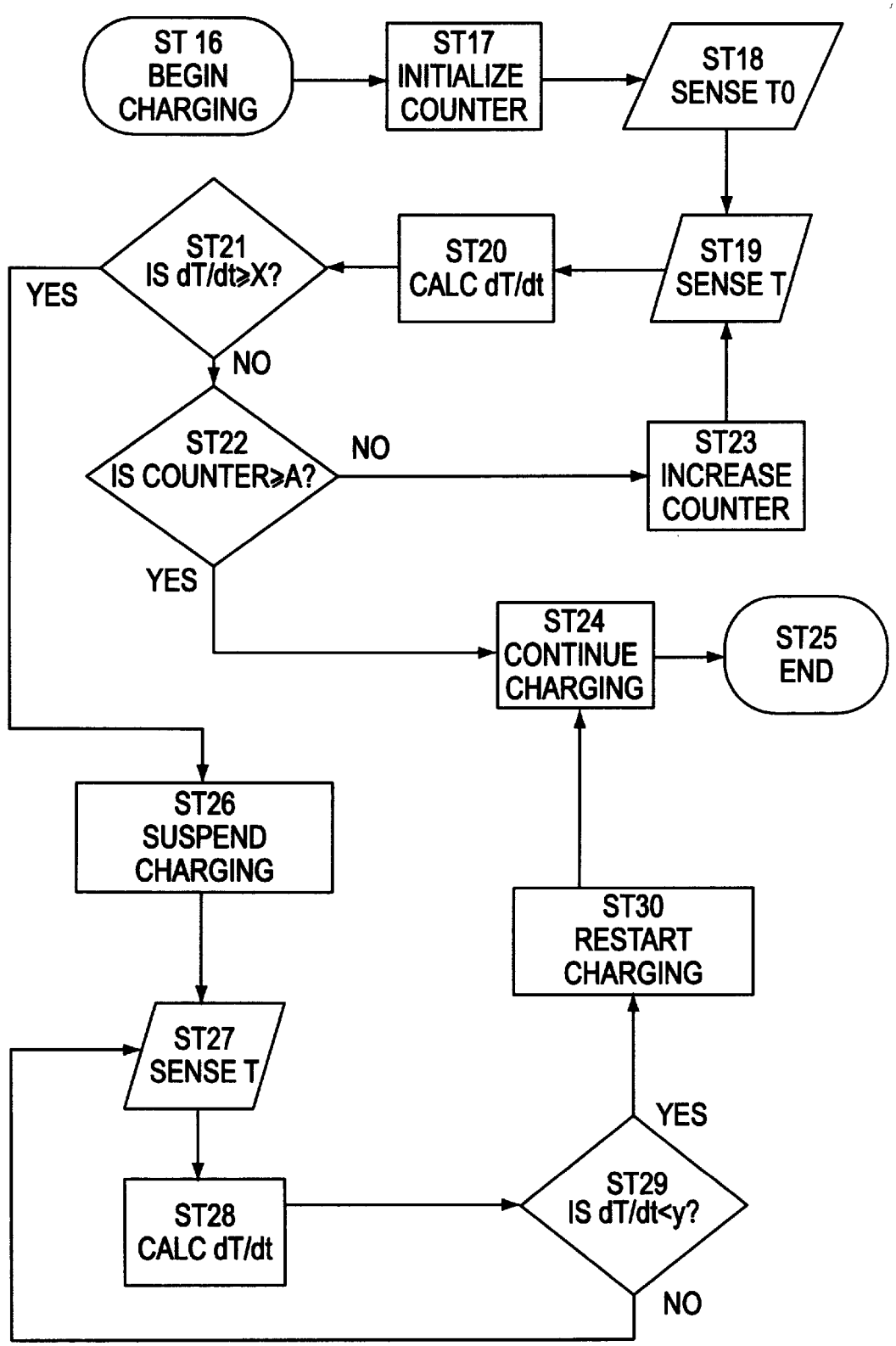
FIG. 3 is a flowchart illustrating a second embodiment of the charging process according to the present invention.

FIG. 3 is a flowchart of the different steps comprised in a second embodiment of the proposed method. The first step (ST16) is to begin the charging process by sending current to battery 10. The controller 21 may initialize a counter (ST17).

The controller 21, via its inputs, may sense the initial battery temperature T0 (ST18). Preferably, if the initial temperature T0 is above a certain threshold, the controller 21 will discontinue charging. The controller 21 may restart charging if the battery temperature falls below the threshold or after a predetermined period of time has elapsed. Preferably, charging will be suspended if the battery temperature is above 45° C.

Persons skilled in the art should recognize that steps ST17 and/or ST18 may be performed before the charging process is begun on step ST16.

The controller 21 preferably continues to sense the battery temperature (ST19). In addition, the controller 21 calculates the temperature change rate, i.e., first derivative of temperature dT/dt (ST20). The controller 21 also determines whether the temperature change rate is above or below a predetermined threshold X (ST21). Preferably, the predetermined threshold X for NiCd batteries is between about 0.7 and 2.0 Celsius degrees per minute, with the preferred threshold being about 1.2 Celsius degrees per minute.

If the temperature change rate is below threshold X, the controller 21 may then determine whether the counter is higher than or equal to a predetermined threshold A (ST22). If not, the counter is increased (ST23) and the controller 21 continues to sense the battery temperature (ST19). If the counter is higher than or equal to threshold A, the controller 21 then continues charging the battery (ST24) until termination occurs (ST25).

Persons skilled in the art will recognize that the counter is used to determine whether the temperature change rate exceeds threshold X within a predetermined period of time. Accordingly, the counter may be replaced by a timer. Alternatively, the decreasing counter may be used instead of the increasing timer mentioned above. Again, the speed, frequency or orientation of the counter do not matter so long as it can determine whether the temperature change rate exceeds threshold X within a predetermined period of time. The predetermined period of time may be less than 5 minutes long, preferably beginning at the start of the charging process. Preferably, the predetermined period of time is 2 minutes.

If the temperature change rate is above the threshold X, the charging process is suspended (ST26). In other words, current is not sent to battery 10. The controller 21 then preferably continues to sense the battery temperature (ST27), calculating the temperature change rate dT/dt (ST28), and determining whether the temperature change rate is above or below a predetermined threshold Y (ST29). Preferably, the predetermined threshold Y is equal to the predetermined threshold X.

The controller 21 may continue repeating these steps until the temperature change rate is below threshold Y, or until a predetermined period of time has elapsed. Once either condition is met, the charging process is restarted (ST30). In other words, current is re-sent to battery 10. Charging of the battery then continues (ST24) until termination (ST25).

Persons skilled in the art will recognize that further equalization and/or maintenance currents may be fed to battery 10 after the termination of the charging process.

Figure 4:
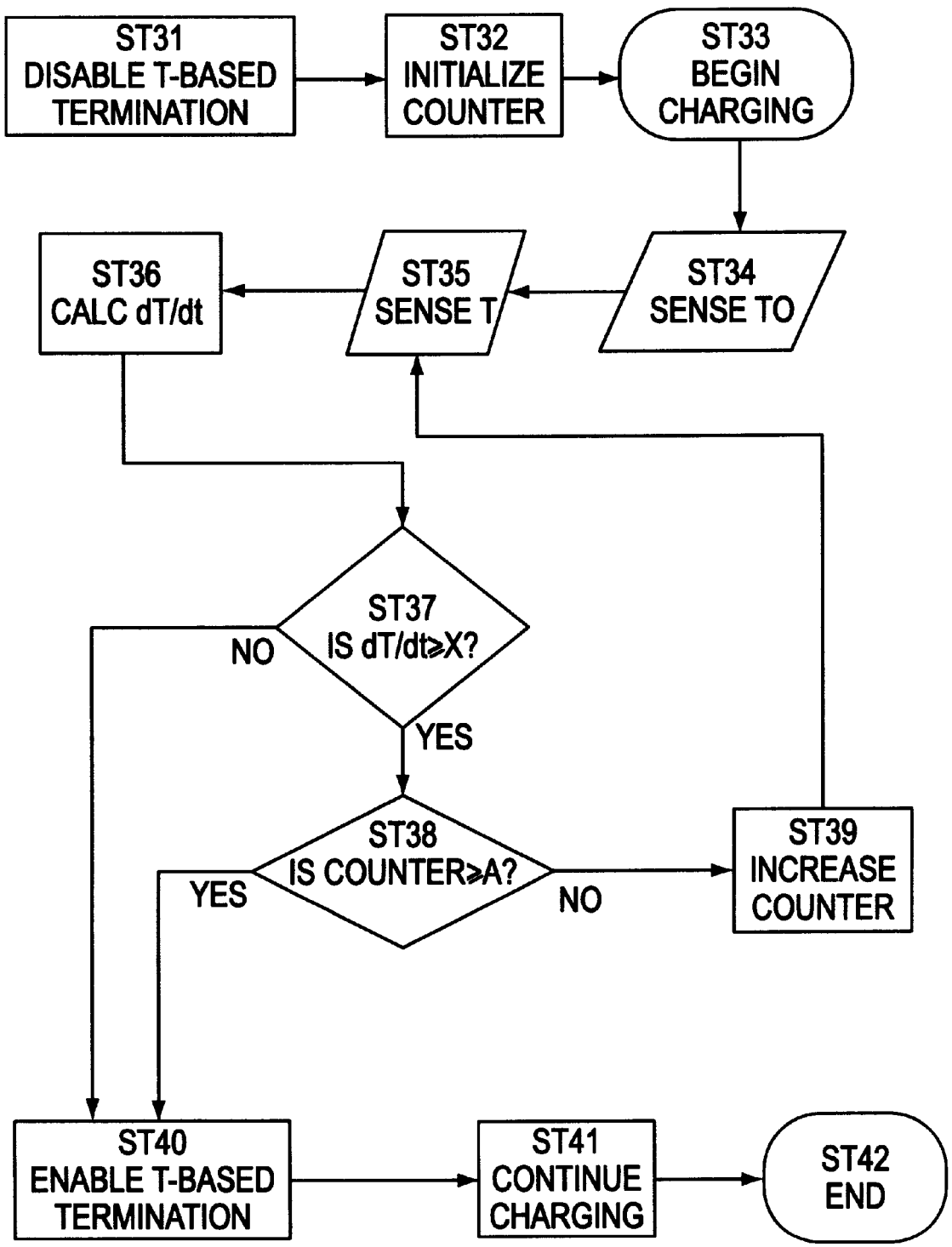
FIG. 4 is a flowchart illustrating a third embodiment of the charging process according to the present invention.

FIG. 4 is a flowchart of the different steps comprised in a third embodiment of the proposed method. The first step (ST31) is to disable termination of the charging process based on temperature schemes. In other words, the charging process cannot be terminated based on the absolute temperature and/or temperature change rate schemes explained above. Further, the charging process preferably cannot be terminated based on any other scheme that uses any type of temperature information, such as the double derivative of temperature scheme disclosed in U.S. Pat. No. 5,519,303. Charging nevertheless may still be terminated at any time using voltage-based schemes as explained above.

The controller 21 may initialize a counter (ST32) and then begin the charging process by sending current to battery 10 (ST33).

The controller 21, via its inputs, may sense the initial battery temperature T0 (ST34). Preferably, if the initial temperature T0 is above a certain threshold, the controller 21 will discontinue charging. The controller 21 may restart charging if the battery temperature falls below the threshold or after a predetermined period of time has elapsed. Preferably, charging will be suspended if the battery temperature is above about 45° C.

Persons skilled in the art should recognize that the order of steps ST31 through ST34 may be altered in any way or manner so desired.

The controller 21 preferably continues to sense the battery temperature (ST35). In addition, the controller 21 calculates the temperature change rate, i.e., first derivative of temperature dT/dt (ST36). The controller 21 also determines whether the temperature change rate is above or below a predetermined threshold X (ST37). Preferably, the predetermined threshold X for NiCd batteries is between about 0.7 and 2.0 Celsius degrees per minute, with the preferred threshold being about 1.2 Celsius degrees per minute.

If the temperature change rate is above threshold X, the controller 21 may then determine whether the counter is higher than or equal to a predetermined threshold A (ST38). If not, the counter is increased (ST39) and the controller 21 continues to sense the battery temperature (ST35). If the counter is higher than or equal to threshold A, temperature-based termination is re-enabled (ST40). In other words, the charging process can now be terminated based on the absolute temperature, temperature change rate and/or double derivative of temperature schemes explained above. Charging of the battery then continues (ST41) until termination (ST42).

Persons skilled in the art will recognize that the counter is used to determine whether the temperature change rate exceeds threshold X within a predetermined period of time. Accordingly, the counter may be replaced by a timer. Alternatively, the decreasing counter may be used instead of the increasing timer mentioned above. Again, the speed, frequency or orientation of the counter do not matter so long as it can delineate a predetermined period of time. The predetermined period of time may be less than 5 minutes long, preferably beginning at the start of the charging process. Preferably, the predetermined period of time is 2 minutes.

If the temperature change rate is below the threshold X termination of the charging process based on temperature schemes is re-enabled (ST40). In other words, the charging process can now be terminated based on the absolute temperature, temperature change rate and/or double derivative of temperature schemes explained above. Charging of the battery then continues (ST41) until termination (ST42).

Persons skilled in the art will recognize that further equalization and/or maintenance currents may be fed to battery 10 after the termination of the charging process.

Persons skilled in the art may recognize other alternatives or additions to the means or steps disclosed herein. However, all these additions and/or alterations are considered to be equivalents of the present invention.

What is claimed is:

1. A method for charging a battery comprising:
   providing a current to the battery;
   sensing battery temperature;
   determining temperature change rate;
   disabling termination of the charging of the battery based on a temperature-based scheme if the temperature change rate exceeds a first predetermined threshold within a first predetermined period of time.

2. The method of claim 1, wherein the first predetermined threshold is between about 0.7 and 2.0 Celsius degrees per minute.

3. The method of claim 1, wherein the first predetermined threshold is about 1.2 Celsius degrees per minute.

4. The method of claim 1, wherein the first predetermined period of time is less than about 5 minutes.

5. The method of claim 1, wherein the first predetermined period of time is about 2 minutes.

6. The method of claim 1, further comprising re-enabling termination of the charging of the battery based on a temperature-based scheme if the temperature change rate is less than a second predetermined threshold.

7. The method of claim 6, wherein the second predetermined threshold is between about 0.7 and 2.0 Celsius degrees per minute.

8. The method of claim 6, wherein the second predetermined threshold is about 1.2 Celsius degrees per minute.

9. The method of claim 6, further comprising termination based on a voltage-based scheme prior to re-enablement of termination based on a temperature-based scheme.

10. The method of claim 1, further comprising re-enabling termination of the charging of the battery based on a temperature-based scheme after a second predetermined period of time has elapsed.

11. The method of claim 10, further comprising termination based on a voltage-based scheme prior to re-enablement of termination based on a temperature-based scheme.

12. The method of claim 1, wherein said temperature-based scheme is one of the group consisting of the absolute temperature scheme, temperature change rate scheme, and double derivative scheme.

13. A method for charging a battery comprising:
providing a current to the battery;
sensing battery temperature;
determining temperature change rate;
suspending providing of current based on a temperature-based scheme if the temperature change rate exceeds a first predetermined threshold within a first predetermined period of time.

14. The method of claim 13, wherein the first predetermined threshold is between about 0.7 and 2.0 Celsius degrees per minute.

15. The method of claim 13, wherein the first predetermined threshold is about 1.2 Celsius degrees per minute.

16. The method of claim 13, wherein the first predetermined period of time is less than about 5 minutes.

17. The method of claim 13, wherein the first predetermined period of time is about 2 minutes.

18. The method of claim 13, further comprising restarting charging if the temperature change rate is less than a second predetermined threshold.

19. The method of claim 18, wherein the second predetermined threshold is between about 0.7 and 2.0 Celsius degrees per minute.

20. The method of claim 18, wherein the second predetermined threshold is about 1.2 Celsius degrees per minute.

21. The method of claim 13, further restarting providing of current after a second predetermined period of time has elapsed.

22. A method for charging a battery comprising:
providing a current to the battery;
sensing battery temperature;
determining temperature change rate;
disabling a charging function if the temperature change rate exceeds a first predetermined threshold within a first predetermined period of time; and
re-enabling the charging function (1) if the temperature change rate is less than a second predetermined threshold or (2) after a second predetermined period of time has elapsed.

23. The method of claim 22, wherein the first predetermined threshold is between about 0.7 and 2.0 Celsius degrees per minute.

24. The method of claim 22, wherein the first predetermined threshold is about 1.2 Celsius degrees per minute.

25. The method of claim 22, wherein the first predetermined period of time is less than about 5 minutes.

26. The method of claim 22, wherein the first predetermined period of time is about 2 minutes.

27. The method of claim 22, wherein the second predetermined threshold is between about 0.7 and 2.0 Celsius degrees per minute.

28. The method of claim 22, wherein the second predetermined threshold is about 1.2 Celsius degrees per minute.

29. The method of claim 22, wherein the charging function is termination based on a temperature-based scheme.

30. The method of claim 29, wherein said temperature-based scheme is one of the group consisting of the absolute temperature scheme, temperature change rate scheme, and double derivative scheme.

31. The method of claim 22, wherein the charging function is providing current to the battery.

32. The method of claim 22, wherein the charging function is charging the battery.

33. A method for charging a battery comprising:
providing a current to the battery;
sensing battery temperature;
determining temperature change rate;
disabling termination of the charging of the battery based on a temperature-based scheme until (1) the temperature change rate is lower than a first predetermined threshold or (2) a first predetermined period of time has elapsed.

34. The method of claim 33, wherein the first predetermined threshold is between about 0.7 and 2.0 Celsius degrees per minute.

35. The method of claim 33, wherein the first predetermined threshold is about 1.2 Celsius degrees per minute.

36. The method of claim 33, wherein the first predetermined period of time is less than about 5 minutes.

37. The method of claim 33, wherein the first predetermined period of time is about 2 minutes.

38. The method of claim 33, further comprising termination of the charging of the battery based on a voltage-based scheme prior to re-enablement of termination based on a temperature-based scheme.

39. The method of claim 33, wherein said temperature-based scheme is one of the group consisting of the absolute temperature scheme, temperature change rate scheme, and double derivative scheme.

40. A method for charging a battery comprising:
providing a current to the battery;
sensing battery temperature;
determining temperature change rate;
disabling a charging function until (1) the temperature change rate is lower than a first predetermined threshold or (2) a first predetermined period of time has elapsed.

41. The method of claim 40, wherein the first predetermined threshold is between about 0.7 and 2.0 Celsius degrees per minute.

42. The method of claim 40, wherein the first predetermined threshold is about 1.2 Celsius degrees per minute.

43. The method of claim 40, wherein the first predetermined period of time is less than about 5 minutes.

44. The method of claim 40, wherein the first predetermined period of time is about 2 minutes.

45. The method of claim 40, wherein the charging function is termination based on a temperature-based scheme.

46. The method of claim 45, wherein said temperature-based scheme is one of the group consisting of the absolute temperature scheme, temperature change rate scheme, and double derivative scheme.

* * * * *